United States Patent [19]

Hayashi

[11] Patent Number: 4,631,783
[45] Date of Patent: Dec. 30, 1986

[54] HOLDING UNIT

[75] Inventor: Yoshitoki Hayashi, Aichi, Japan

[73] Assignee: Kitagawa Industries Co., Ltd., Nagoya, Japan

[21] Appl. No.: 617,540

[22] Filed: Jun. 5, 1984

[30] Foreign Application Priority Data

Jun. 21, 1983 [JP] Japan .................. 58-111686

[51] Int. Cl.⁴ ............................. F16L 3/12
[52] U.S. Cl. ................ 24/16 PB; 24/30.5 S; 211/70.6; 248/309.1; 279/1 K
[58] Field of Search ............ 211/70.6; 24/16 PB, 24/16 R, 662, 681, 653, 30.5 S; 248/309.1, 315, 359 R, 309.1, 60; 279/1 K

[56] References Cited

U.S. PATENT DOCUMENTS

| | | |
|---|---|---|
| 3,339,246 | 9/1967 | Geisinger ............... 24/16 PB |
| 3,516,111 | 6/1970 | Heyman ................. 248/314 X |
| 3,872,547 | 3/1975 | Caveney et al. |
| 3,925,852 | 12/1975 | Wood ..................... 24/30.5 S X |
| 4,128,220 | 12/1978 | McNeel .................. 248/60 |
| 4,138,055 | 2/1979 | Harrison ................ 248/309.1 X |
| 4,182,005 | 1/1980 | Hanington .............. 279/1 K |

FOREIGN PATENT DOCUMENTS

| | | |
|---|---|---|
| 1234618 | 2/1967 | Fed. Rep. of Germany ... 24/30.5 S |
| 616219 | 1/1949 | United Kingdom . |
| 949994 | 2/1964 | United Kingdom . |
| 2028413 | 3/1980 | United Kingdom ......... 24/30.5 S |
| 1567441 | 5/1980 | United Kingdom . |

Primary Examiner—Robert W. Gibson, Jr.
Attorney, Agent, or Firm—Oblon, Fisher, Spivak, McClelland & Maier

[57] ABSTRACT

A holding unit for holding one or a plurality of tools and articles comprising a holding portion having resilient thin plates or segments divided by a plurality of radially extended slits at a predetermined angular distance and arranged in a ring or in an elliptical form, the envelope of the extreme open edge of each segment forming a hole, a mounting portion which may be formed in various different shapes, such as a belt member, one or more resilient detent members, etc. According to one embodiment of the holding unit, when an article to be held is inserted into the hole formed by the envelope of the extreme edge of each thin plate segments divided by the radially extended slits, the article thus inserted is firmly gripped by the periphery of the thin plate segments, thus enabling an article to be held therein or to be removed therefrom.

7 Claims, 21 Drawing Figures

HOLDING UNIT

BACKGROUND OF THE INVENTION (1) Field of the Invention

The present invention relates to a holding unit for holding tools and articles, particularly to a holding unit also having a holding portion formed by a resilient thin plate or plates divided by radially extend slits which is capable of removably holding these tools and articles speedily.

(2) Description of the Prior Art

Among tools and articles, there are many which always demand to be held in a certain predetermined place in view of their purposes for use. For instance, it is desirable to always keep particular tools and articles in the vicinity of particular machinery in use in order to carry our adjustment work and cutlery changing work smoothly and effectively. For this purpose, it is commom practice that a securing member is kept or fixed at one end of a chain which is tied on, for instance, a chuck handle for an electric drill, and that the securing member is in turn fixed on a captyre cord of the electric drill in order to prevent the missing of the chuck handle for the drill, which is quite often used in the work. However, in the securing member according to the prior art, there was a drawback that it was troublesome to handle it as the securing member had to be moved when using as well as the captyre cord was often subject to damage.

In order to hold or keep tools and articles such as screw drivers, spanners and wrenches other than the chuck handle for the electric drills, a holding unit capable of more easily holding these things has been desired but no suitable holding unit has not yet been developed heretofore.

SUMMARY OF THE INVENTION

It is therefore an object of the present invention to provide a holding unit which is capable of speedily and removably holding or setting aside tools and articles at predetermined places.

It is another object of the present invention to provide a holding unit having a holding portion with a holding hole or holes for holding a tool or tools or an article or articles within the hole or holes in which radially slitted resilient thin plates are provided around the hole or holes and a mounting portion which is integrally formed with the holding portion and for mounting the tools and articles.

It is still another object of the present invention to provide a holding unit in which if other diameter of the remaining portion of a tool or an article, e.g. a screw driver, to be held by the holding unit is smaller than the diameter of the screw driver gripped by the holding portion, a rather strong pulling down of the screw driver enables to be come off easily out of the hold by the resiliency of the resilient thin plate segments.

It is yet still another object of the present invention to provide a holding unit in which various types of the mounting portions are arranged in the holding unit in accordance with different purpose of use and different modes of mounting.

One of the features of the holding unit according to the present invention resides in that the holding unit for holding tools and articles which comprises a holding portion having resilent thin plates divided by a plurality of radially extended slits at a predetermined angular distance and arranged generally in the form of a ring, the envelope of the extreme open end of each resilient thin plates forming a hole, and a mounting portion having a belt member with predetermined width and thickness, which extends in the longitudinal direction from one end of said holding portion, a plurality of saw-tooth like projections being formed on both the surface and rear thereof, an elongated mounting hole being also formed at the corresponding position between the resilient thin plate and said one end of the holding portion so as to permit the belt member to be fixed or engaged with the hole by passing through one end of the belt member therein when using.

Another feature of the holding unit according to the present invention resides in that the holding unit for holding a plurality of tools or articles at the same time which comprises a table shaped holding portion having a plurality of groups of holding portions each having a plurality of resilient thin plates or segments divided by radially extended slits at a predetermined angular distance and arranged in the form of a ring respectively, the envelope of the extreme open end of each resilient thin plates forming a hole respectively on the same surface of the table shaped holding portion and a mounting portion for mounting said table shaped holding portion.

These objects, features and advantages of the invention will be apparent from the following detailed description on each embodiment according to the present invention with reference to the attached drawings.

DESCRIPTION OF PREFERRED EMBODIMENT

Figure 1:
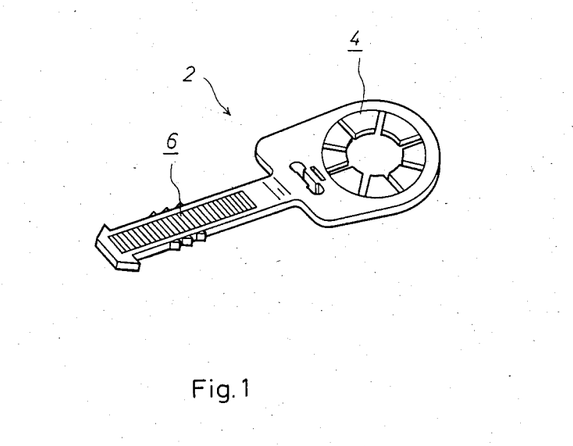
FIG. 1 is a perspective view of a first embodiment of the holding unit according to the present invention.

Referring to FIG. 1, the holding unit 2 according to the present invention comprises an article holding portion 4 and a mounting portion 6 which are integrally formed by one piece made of, for instance, synthetic resin. The holding unit shown in FIG. 1 is the one which is applied to the one for holding a chuck handle for an electric drill.

Figure 2:
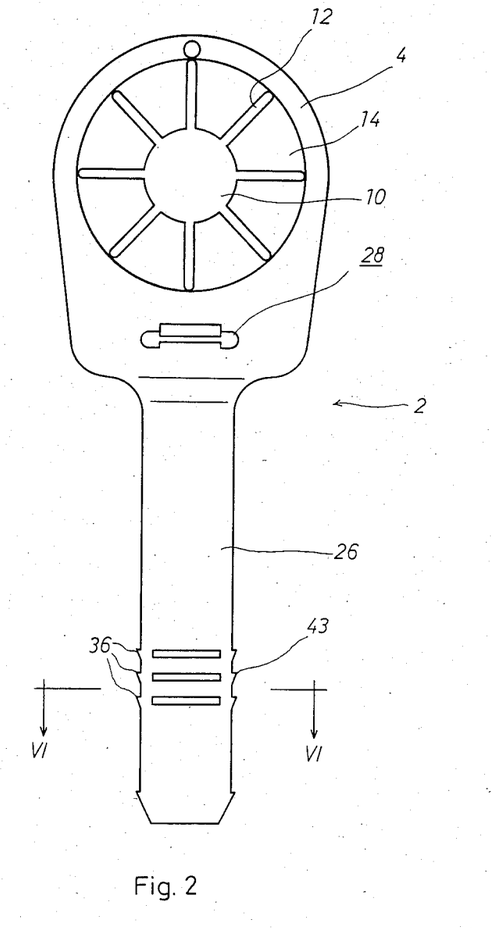
FIG. 2 is an enlarged elevational view of the first embodiment of the holding unit according to the present invention.
Figure 3:
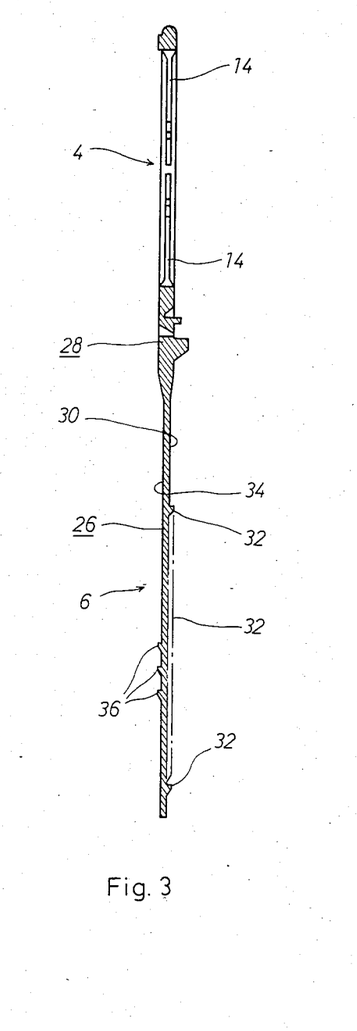
FIG. 3 is an enlarged vertical section of the first embodiment of the holding unit according to the present invention.

FIGS. 2 and 3 show, respectively, an enlarged plan view and an enlarged side view of the holding unit 2 according to the present invention shown in FIG. 1. The holding unit 2 is provided with a plurality of resilient thin plates or segments 14 which are arranged in the radial directions with slits 12 being formed between the adjacent thin plates. That is, the resilient thin plates 14 divided by the radially extended slits 12 are formed in a generally trapezoid shape respectively, and the extreme edges of the thin plate form a hole 10 in the center therof as a whole. Or, it may be considered that one thin resilient ring plate 14 is cut or divided by each slit 12 and the hole 10 is formed by the inner periphery of each divided plate. The resilient thin plates 14 have a sufficient resiliency respectively and it has also a sufficient flexibility.

Figure 4:
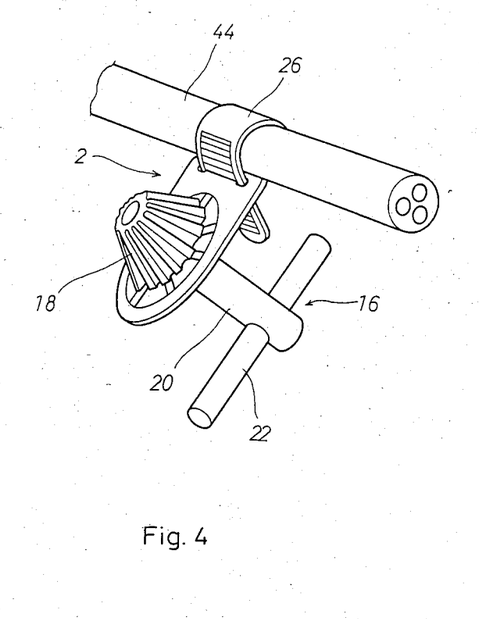
FIG. 4 is a perspective view of the holding unit according to the present invention in use, with the belt portion ties to a captyre cord of an electric machine.
Figure 5:
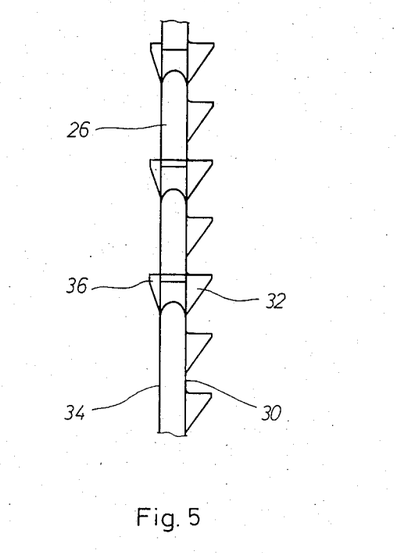
FIG. 5 is an enlarged partial view of the belt portion shown in FIG. 3 in the longitudinal direction, with saw teeth being formed on both the surface and rear surface thereof.

The diameter of the hole 10 is smaller that that of the head 18 of the chuck handle 16 for the electric drill as shown in FIG. 4, for instance, to be held therin, but is larger than that of the stem 20 of the chuck handle 16. Accordingly, when the head 18 is pushed into the hole 10, as shown in FIG. 4 the chuck handle or drill changing tool 16 can be prevented from being come off by both the head 18 of the stem 20 and the handle 22.

The combination of the holding portion 4 and mounting portion 6 in FIG. 1 or 26 in FIG. 2 is formed like a parking meter shape as a whole which comprises the holding portion 4, and a belt portion 26 which are integrally formed. An elongated detent hole 28 is formed between the head of the holding portion 4 and the belt portion 26. The belt portion 26 is provided with a plurality of (in this case, three teeth) detent saw-teeth 36 on the surface 34 which prevent the slipping of the belt when tied together during a mounting work and on the rear surface 30 thereof there is also provided a number of detent saw teeth 32, as shown in FIGS. 1, 2, 3, 5, and 6, respectively.

Figure 6:
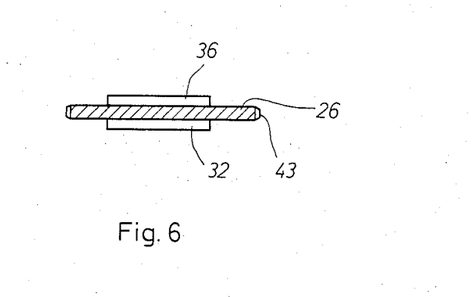
FIG. 6 is a partially enlarged side view of the holding portion having the detent hole of the holding unit, cut along the line VI—VI in FIG. 2.
Figure 7:
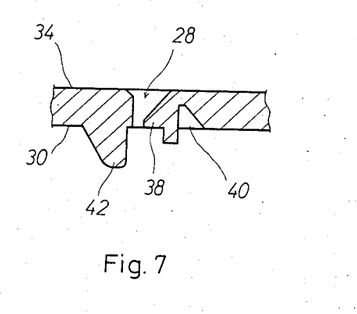
FIG. 7 is an enlarged sectional view of the detent hole shown in FIG. 3.
Figure 8:
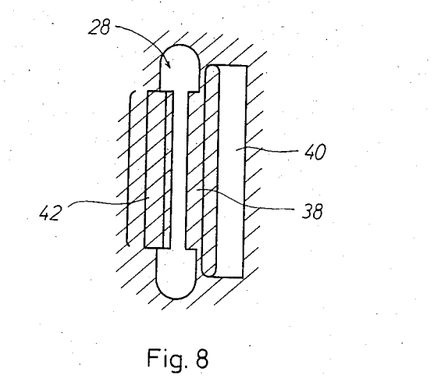
FIG. 8 is an enlarged plan view of the holding portion having the detent hole of the holding unit viewed from the rear surface thereof in FIG. 7.

The detent hole 28 has predetermined size and width into which the belt portion 26 can be fitted as shown in FIGS. 7 and 8. One one side wall of the belt, there is provided a shelf or projection 38 which is capable of engaging with the teeth 32, while a recess 40 is formed along the projection 38 on the rear surface 30 thereof. Accordingly, the base of the projection 38 is resiliently deformed when using, and it can be easily engaged with the detent teeth 32. Moreover, on the rear surface 30 of the detent hole 28, there is provided another elongated projection 42 along the other side wall. Consequently, when using, the belt portion 26 is inserted into the detent hole 28 as shown in FIG. 4, the projection 42 contacts with the rear surface 30 of the belt portion 26 and the projection 38 can also easily engage with the detent teeth 32. In this case, on the both sides of the belt portions, there are provided saw-teeth shaped projections 43 as shown in FIGS. 2 and 6. All the components of the holding unit 2 according to the present invention shown in FIGS. 2 and 6. All the components of the holding unit 2 according to the present invention shown in FIGS. 1, 2, 3, 5, 6, 7 and 8 may be integrally formed by one piece.

Figure 9:
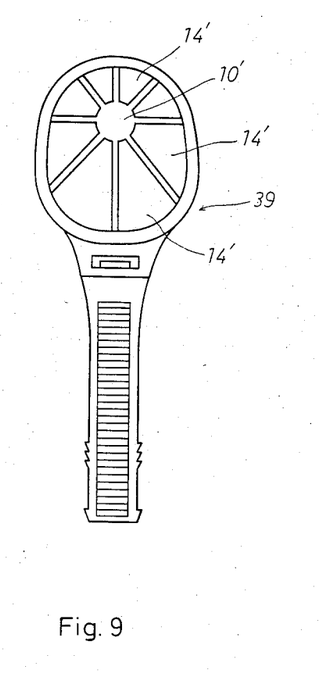
FIG. 9 is an elevational view of a second embodiment of the holding unit according to the present invention.

FIG. 9 shows another embodiment of the holding unit 39 according to the present invention, in which the holding hole is formed by the envelope of the extreme edges of divided thin plate, and the holding hole may be located eccentrically. That is, each divided resilient thin plate 14' can be formed in different shape as shown in FIG. 9. In this case, when mounting the handle 16, no excessive force is extended on the thin plate 14', there is an advantage that life time of the holding unit can be extended.

When using the holding unit 2 according to the invention thus constructed, the belt portion 26 is wound around the captyre cord 44 of an electric drill not shown and after the belt is inserted into the detent hole 28, the pulling of the belt 26 causes the holding unit to be firmly fixed to the cord as shown in FIG. 4. Moreover, when mounting or holding the chuck handle 16, the head 18 of the chuck handle 16 is pushed into the holding hole 10. Then, the thin plates 14 are resiliently deformed and it is held by the holding unit according to the present invention. All the components of the holding unit can be also formed integrally by one piece.

Figure 10:
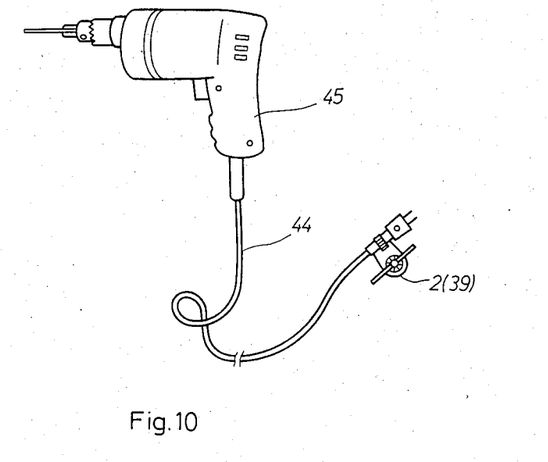
FIG. 10 is the holding unit according to the present invention which holds a chuck handle of a portable electric drill and which is mounted to the end of a plug of the drill.

On the other hand, when mounting or fixing the chuck handle of a portable electric drill 45 on the holding unit according to the present invention it is desirable to fix the holding unit at the end of a plug of the captyre cord 44 of the drill 45 and then the chuck handle is secured thereon as shown in FIG. 10.

Figure 11:
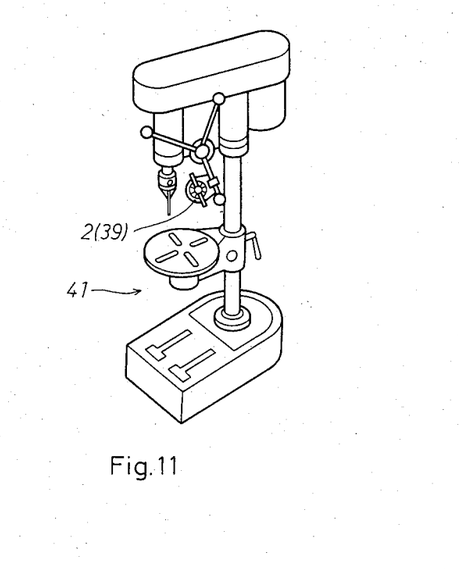
FIG. 11 is a perspective view of another example of mounting the holding unit to a handle of a table drilling press, with the chunk handle of the press being fixed to the holding portion of the holding unit according to the present invention.

Furthermore, when mounting or fixing the holding unit according to the present invention on a table drilling press 41, it can be conveniently mounted on the lever handle of drilling press 41 and then the chuck handle is secured thereon, as shown in FIG. 11.

Figure 12:
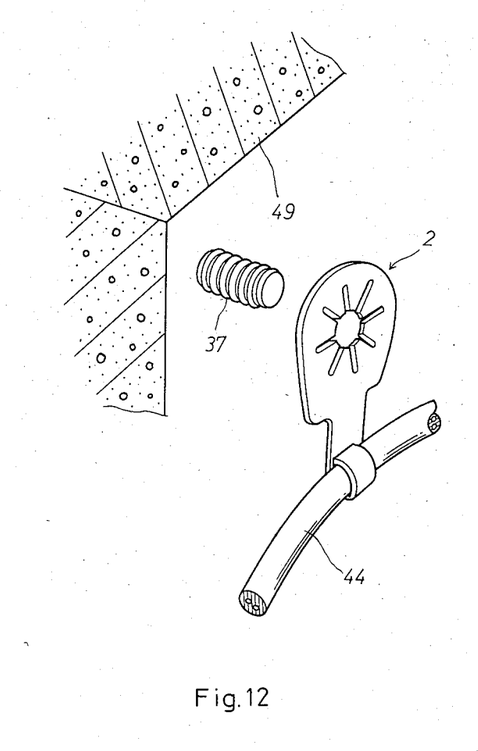
FIG. 12 is a perspective view of still another example of mounting the holding unit to a bolt or a screw embeded on a concrete wall.

FIG. 12 shows another example of mounting the holding unit according to the present invention on a screw fixed or secured on a concrete wall. Namely, when using an electric drill on the spur in factory premises, for instance, the holding unit 2 for holding the chuck handle of the drill can be mounted on a lock screw 37 which has been embeded at its one end in a concrete wall 49 after removing plate frames on the concrete wall.

Figure 13:
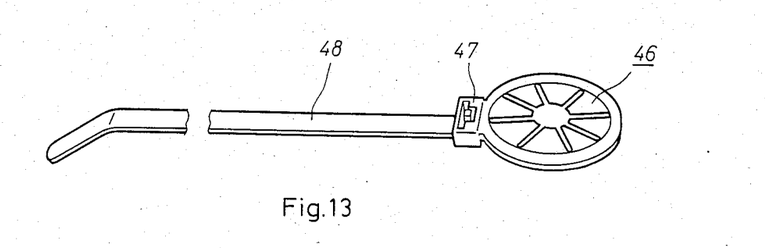
FIG. 13 is a third embodiment of the holding unit according to the present invention.

FIG. 13 shows another embodiment of the holding unit according to the present invention. The holding unit shown in the figure has a long belt portion 48, as well as the article holding portion 46 and the detent hole 47 at one end of the holding portion, similar to FIGS. 1, 2, 7 and 8.

In the foregoing embodiments of the holding unit according to the present invention, the description has been made about the case where the chuck handles of various electric drills and portable drilling presses are held or secured on the holding unit according to the present invention. However, other tools and articles such as screw drivers, pens and pencils, i.e., writing materials, kitchen utensils etc. can be held by the holding unit according to the present invention. In this case, all the components of the holding unit may be also formed integrally by one piece.

Figure 14:
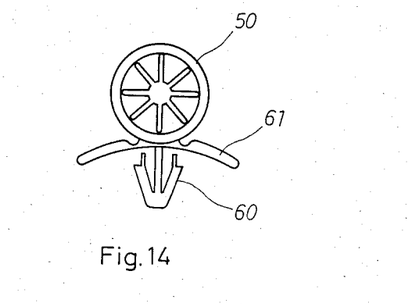
FIG. 14 is a fourth embodiment of the holding unit according to the present invention which has a resilient detent member and a pushing member.

FIG. 14 shows another embodiment of the holding unit according to the present invention which has a holding portion 50, an arrow shaped resilient detent member 60 and a resilient press member 61, which are all integrally formed. The arrow shaped resilient detent member 60 is inserted into a hole not shown on an object to which the holding unit is mounted.

Figure 15:
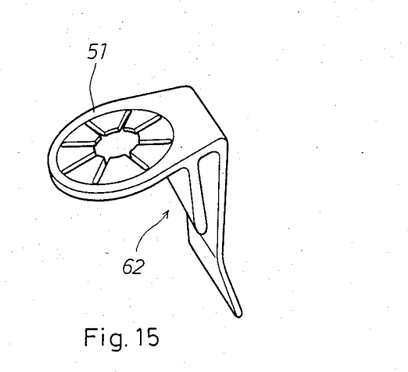
FIG. 15 is a fifth embodiment of the holding unit according to the present invention, FIGS. 16 (a) and (b) show respectively a elevational view and a side view of a sixth embodiment of the holding unit according to the present invention having two resilient detent member.

FIG. 15 shows still another embodiment of the holding unit according to the present invention. In this embodiment, the mounting portion 62 is formed in such a manner that it has two belt portions and they can grip the edge of a plate member and the like. All the components of the holding unit according to the present invention are also integrally formed by one piece in this case.

Figure 16:
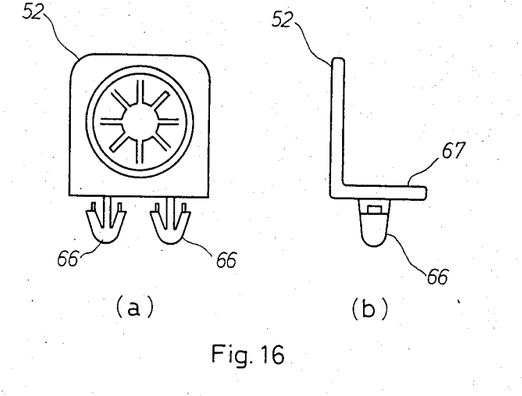

FIGS. 16 (a), (b) show elevational and side views yet still another embodiment of the holding unit according to the present invention. In this embodiment, the holding unit comprises a L-shaped holding portion 52 in its cross section which has a radially slitted thin plate similar to that in FIG. 1 on the erected plate thereof, and one or more resilient detent members 66 similar to that in FIG. 14 are provided on the bent bottom surface of the horizontal plate thereof which are all integrally formed by one piece.

Figure 17:
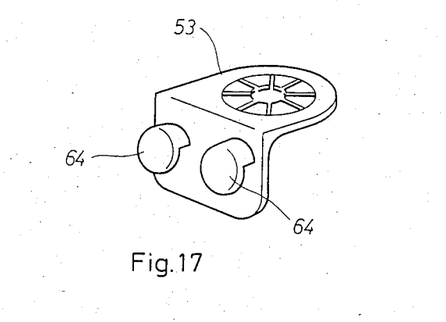
FIG. 17 is the perspective view of a seventh embodiment of the holding unit according to the present invention, viewed from the bottom side thereof.
Figure 18:
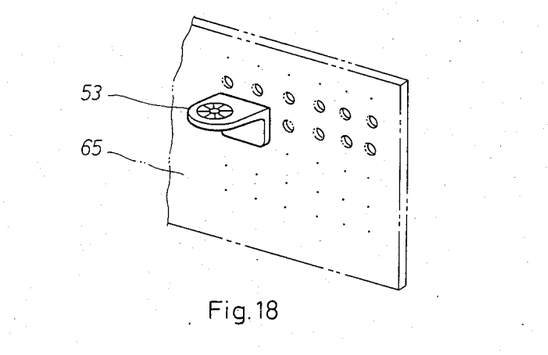
FIG. 18 is the holding unit shown in FIG. 17 mounted to a kitchen board having mounting holes, according to the present invention.

FIG. 17 shows another embodiment of the holding unit according to the present invention. In this case, one or more round chair like mounting portions 64 are provided at the bottom plate of the bent holding portion 53, instead of the resilient detent member as shown in FIGS. 14 and 16. As shown in FIG. 18, the round chair like mounting portions 64 are inserted into a hole or holes on a kitchen mounting board 65 having many hole thereon and it is fixed thereto. All the components of the holding unit in FIG. 17 may be also formed integrally by one piece.

Figure 19:
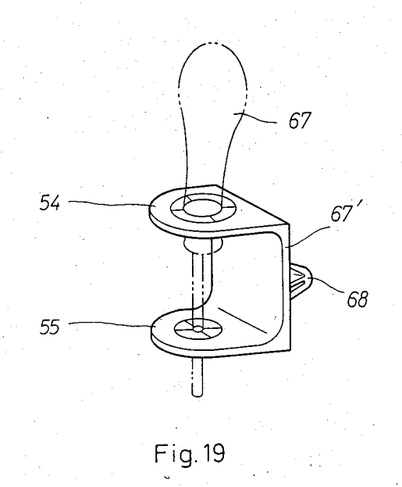
FIG. 19 is a perspective view of a eighth embodiment of the holding unit according to the present invention, showing a screw driver inserted therein shown by a chain line.

FIG. 19 shows another embodiment of the holding unit according to the present invention. In this case, the holding portion consists of double bent plate portion 54, 55 which are erected at the right angle against the base plate 67'. Two groups of the radially slitted resilient thin plates having different mounting hole formed by each envelope of the thin plates are provided on each erected plate portion, respectively. On the bottom surface of the base plate, there is provided at least one resilient detent member 68 similar to the one shown in FIGS. 14 and 16. This holding unit is suitable for holding, for instance, a screw driver 67 as shown in a chain like or a double-dot dashed line. All the components of the holding unit are also integrally formed by one piece in this case.

Figure 20:
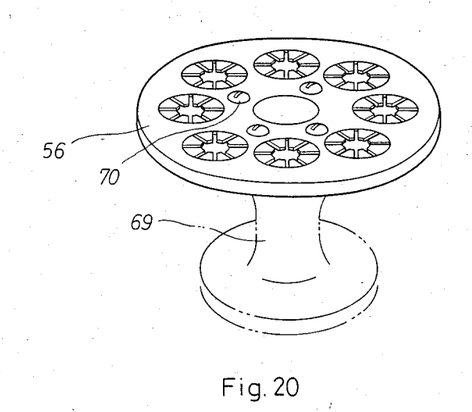
FIG. 20 is a perspective view of a ninth embodiment of the holding unit in a table type from which has a plurality of holding portions, each having radially slitted resilient thin plate.

FIG. 20 shows still another embodiment of the holding unit according to the present invention. In this embodiment, a plurality of the holding portions having also a plurality of groups of the radially slitted resilient thin plates are formed on the surface of a table 56 with a leg portion 69 or a table member 56 on which the plurality of the holding portion having the groups of the radially slitted resilient thin plates are formed, is mounted to support 69 by screw 70. This holding unit is particularly suitable for holding kitchen utensiles, such as spoons and forks and the like.

Figure 21:
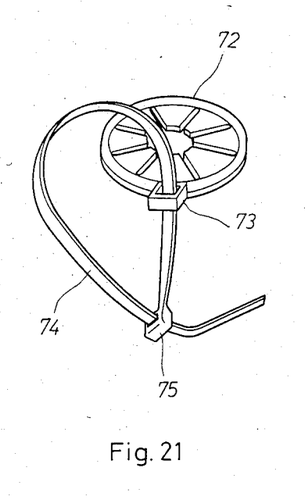
FIG. 21 is a perspective view of tenth embodiment of the holding unit according to the present invention, which is a combination of the holding portion and an independent long belt portion.

FIG. 21 shows another embodiment of the holding unit according to the present invention. The holding unit comprises only the circular holding portion 72 having the radially slitted resilient thin plates and a mounting portion 73 provided at one edge on the periphery thereof, which is formed for instance a rectangular shape having a hole at its center. This holding unit is accompanied by an independent and rather long belt portion or member 75 having also a rectangular mounting member 75 at one end thereof, similar to that of the holding portion. The one end of the belt portion is penetrated through the two rectangular mounting portions, i.e., the mounting portion 73 of the holding portion and the mounting member 75 of the belt itself as shown in FIG. 21. This holding unit is particularly suitable for mounting or fixing the holding unit to a machine having a large arm or a pillar having a large diameter and the like. In this embodiment, the mounting portion 73 and mounting member 75 are shown as being a rectangular shape, respectively. However, any other shapes such as circle, triangle, or polygon may be employed to the mounting portion and mounting member. Moreover, in this embodiment, the holding unit can be mounted through a screw by inserting it into the mounting portion 73 of the holding unit, instead of using the belt member 74.

As described in the foregoing embodiment, a holding portion for holding articles or an article is constructed in such a manner that a plurality of radially slitted resilient thin plates or one radially slitted resilient thin plate provided in the holding unit according to the present invention and each hole is formed by the envelope of the extreme ends of the radially slitted resilient thin plate or plates, so that when an article to be held is inserted into the hole, the resilient thin plates or plate is deformed and the article thus inserted is gripped by the periphery of the hole and of the thin plate or plates, thus enabling the easy retaining of the article by the holding unit.

Moreover, another feature of the holding unit according to the present invention, resides in that various types of the mounting portions are arranged in the holding unit in accordance with different purposes of use and different modes of mounting.

In addition, in the holding unit according to the present invention, if other diameter or diameters of the remaining portion or a thing, e.g. a screw driver, to be held by the holding unit is smaller than the diameter of the screw driver gripped by the holding portion, a rather strong pulling down of the screw driver having the smaller diameter or diameters enables the thing or the screw driver in this case to be come off easily out of the hole by the resiliency of the thin plates or a plate, i.e. by resiliently deforming the periphery of the hole formed by the envelope of each resilient thin plate with the radially extended slits, thus facilitating the handling of tools and articles.

According to the holding unit of the present invention, as articles and goods including tools necessary for holding or keeping can be always retained or held safely at predetermined positions or places, it enables the articles and goods to be prevented from missing, as well as they can be removably and securedly held thereat.

While the invention has been described in its preferred embodiments it is to be understood that the words which have been used are words of description rather than limitation and that various changes and modification may be made within the purview of the appended claims without departing from the true scope and spirit of the invention in its broader aspects.

What is claimed is:

1. A holding unit for holding a tool and the like, said holding unit having first and second opposite faces, being elongate in a longitudinal direction thereof, and having a thickness that is everywhere substantially less than its longitudinal and transverse dimensions, said holding unit comprising:

a holding portion for holding a tool and comprising a plurality of resilient thin plates disposed substantially in a ring so as to form a central hole, said plates being separated by a plurality of slits extending substantially radially from said central hole toward an outer margin of said holding portion; and a mounting portion for attaching said holding portion to an article, said mounting portion comprising a belt extending longitudinally of said holding unit, there being an elongated mounting hold through said mounting portion, disposed between said belt and said holding portion and extending transversely of said holding unit, said belt comprising a plurality of teeth formed on opposite sides thereof corresponding to said first and second opposite faces of said holding unit, there being an elongate recess formed in a face of said mounting portion corresponding to one of said first and second opposite faces of said holding unit, said elongate recess being spaced from and substantially parallel to said elongated mounting hole, a shelf member being disposed between said elongated mounting hole and said elongate recess and being substantially coextensive in length with said elongate recess, wherein said shelf member is integral with said mounting portion at first and second transverse ends of said shelf member, said shelf member comprising means for engaging said belt when said belt is passed through said elongated mounting hole and for retaining said belt in said elongated mounting hole.

2. A holding unit as set forth in claim 1, wherein said shelf member comprises an oblique surface for engaging said belt upon insertion of said belt into said elongated mounting hole, said mounting portion further comprising at least two transversely-extending projections disposed along opposite sides of said elongated mounting hole for engaging said teeth formed on opposite sides of said belt.

3. A holding unit as set forth in claim 1, wherein said central hole of said holding portion is eccentrically disposed with respect to said ring of resilient thin plates.

4. A holding unit as set forth in claim 1 wherein the length and width of said elongated mounting hole are substantially equal to those of said belt member.

5. A holding unit as set forth in claim 1 wherein the diameter of said central hole of said holding portion and a diameter of said ring of resilient thin plates are formed in such a manner that an article or a tool to be held within the hole can be gripped or hooked by the periphery of the resilient thin plates separated by radially extending slits.

6. A holding unit as set forth in any one of claims 4, 5, 1, 2 or 3, wherein all the components are integrally formed in one piece.

7. A holding unit as set forth in any one of claims 4, 5, 1, 2 or 3, wherein said holding unit is made of synthetic resin.

* * * * *